United States Patent [19]
Bochot et al.

[11] Patent Number: 5,119,911
[45] Date of Patent: Jun. 9, 1992

[54] FLUID COUPLING APPARATUS

[75] Inventors: Jean-Claude Bochot, Claye-Souilly; André Dalbiez, Argenteuil, both of France

[73] Assignee: Valeo, Cedex, France

[21] Appl. No.: 777,174

[22] Filed: Oct. 16, 1991

[30] Foreign Application Priority Data

Oct. 19, 1990 [FR] France .................. 90 12946

[51] Int. Cl.⁵ .................. F16D 3/66; F16H 45/02
[52] U.S. Cl. .................. 192/3.29; 197/106.2
[58] Field of Search .................. 192/3.29, 106.2

[56] References Cited

U.S. PATENT DOCUMENTS

| | | | |
|---|---|---|---|
| 4,693,348 | 9/1987 | Tsukamoto et al. | 192/106.2 X |
| 4,867,290 | 9/1989 | MacDonald et al. | 192/106.2 X |
| 4,919,241 | 4/1990 | Koshimo | 192/3.29 |
| 4,944,499 | 7/1990 | Tojima | 192/106.2 X |
| 4,969,544 | 11/1990 | Fujimoto | 192/106.2 X |

FOREIGN PATENT DOCUMENTS 2076908  12/1981  United Kingdom ............... 192/3.29

*Primary Examiner*—Richard Lorence
*Assistant Examiner*—Nicholas Whitelaw
*Attorney, Agent, or Firm*—Longacre & White

[57] ABSTRACT

A fluid coupling apparatus comprises a torque converter and a locking clutch having a torsion damper. The coupling plate which couples the torsion damper to a coupling element of the clutch, arranged to act as a piston, is provided with two sets of circumferential tongues, with the tongues of at least one of these sets each having a slight, wave-shaped, axial deformation.

7 Claims, 2 Drawing Sheets

FLUID COUPLING APPARATUS

FIELD OF THE INVENTION

This invention relates to a fluid coupling apparatus comprising a locking clutch which is provided with a first coupling element adapted to act as a piston. More particularly, it is directed to an improvement in the flexible annular metal coupling plate which is coupled to the piston for connecting the locking clutch to a torsion damper of the apparatus.

BACKGROUND OF THE INVENTION

A fluid coupling apparatus of the above kind is for example described in the specification of U.S. Pat. No. 4 944 374, but with the major difference that that known coupling apparatus does not have a torsion damper. Such a fluid coupling is more particularly intended for a motor vehicle, and more precisely it is adapted to be interposed between a driving shaft, typically the crankshaft of the vehicle engine, and a driven shaft which is typically the input shaft of a gearbox. The fluid coupling apparatus described includes a simple, resiliently deformable coupling plate which is interposed between the above mentioned coupling element and the hub of the turbine wheel of a torque convertor. The deformation of the coupling plate in the axial direction enables the coupling piston (which is provided with a friction liner) to grippingly engage the casing of the torque convertor. The effect of this is to take the torque convertor out of use in certain configurations of the transmission. For this purpose, the coupling plate includes through apertures in the form of buttonhole-shaped slots, which define at its periphery two sets of resiliently axially deformable tongues, namely a first tongue which is adapted to transmit the torque in propulsive operation, that is to say when the engine is effectively driving the vehicle; and a second set of tongues which is adapted to transmit the torque when the vehicle is operating in a regenerative mode, that is to say when the inertia of the moving vehicle itself is tending to drive, or brake, the engine. The tongues are here joined at their ends to the transmitting element constituted by the coupling piston. When the latter comes into contact, under a hydraulic control pressure, with the wall of the casing, the resulting locking or gripping action enables the turbine wheel to be driven directly by the casing itself. The turbine wheel is coupled to the driven shaft, e.g. the gearbox input shaft, while the casing is coupled in rotation to a driving shaft, e.g. the engine crankshaft.

In certain applications it can be desirable to complement the locking clutch with a torsion damper, such as a conventional damper of the kind comprising helical springs arranged circumferentially between two components which are rotatable relative to each other. In that case, a coupling plate of the kind described above forms part of the torsion damper itself, but it is necessary that the whole of this torsion damper should remain under all circumstances perfectly perpendicular to the axis of rotation of the apparatus, that is to say the common axis of the two shafts mentioned above. However, when the coupling element is displaced, the tongues can distort in an uncontrolled manner under the effect of too large a torque, and the result of this can be to upset the perpendicular relationship between the torsion damper and the general axis of rotation.

DISCUSSION OF THE INVENTION

An objection of the invention is to provide a coupling plate which is so constructed as to overcome the above drawback in operation.

According to the invention, in a fluid coupling apparatus of the kind comprising a locking clutch having a coupling element adapted to act as a piston, together with a coupling plate for coupling the said coupling element to a torque convertor, with the said coupling plate having two sets of resiliently axially deformable tongues, namely a first set in which the tongues extend circumferentially in one direction and a second set in which the tongues extend circumferentially in a second direction opposite to the first direction, the coupling plate is associated with a torsion damper, while the tongues of at least one of the said sets each have a slight wave-shaped axial deformation. This arrangement simplifies the coupling plate, which is less liable to distortion.

The wave-shaped deformation of each tongue, defined above, facilitates the axial displacement of the coupling element which acts as a piston, while at the same time avoiding any accidental distortion of the coupling plate. Preferably, such wave-shaped deformations are provided only on the tongues of one of the two sets, namely the set which is arranged to transmit torque when the vehicle is operating in the regenerative mode. In addition, these tongues are preferably made longer in the circumferential direction than those of the other set.

The invention will be better understood, and its other advantages will appear more clearly, from a reading of the description that follows, of various preferred embodiments of the invention in the form of a fluid coupling apparatus. The description is given by way of example only and with reference to the accompanying drawings.

DESCRIPTION OF PREFERRED EMBODIMENTS OF THE INVENTION

Figure 1:
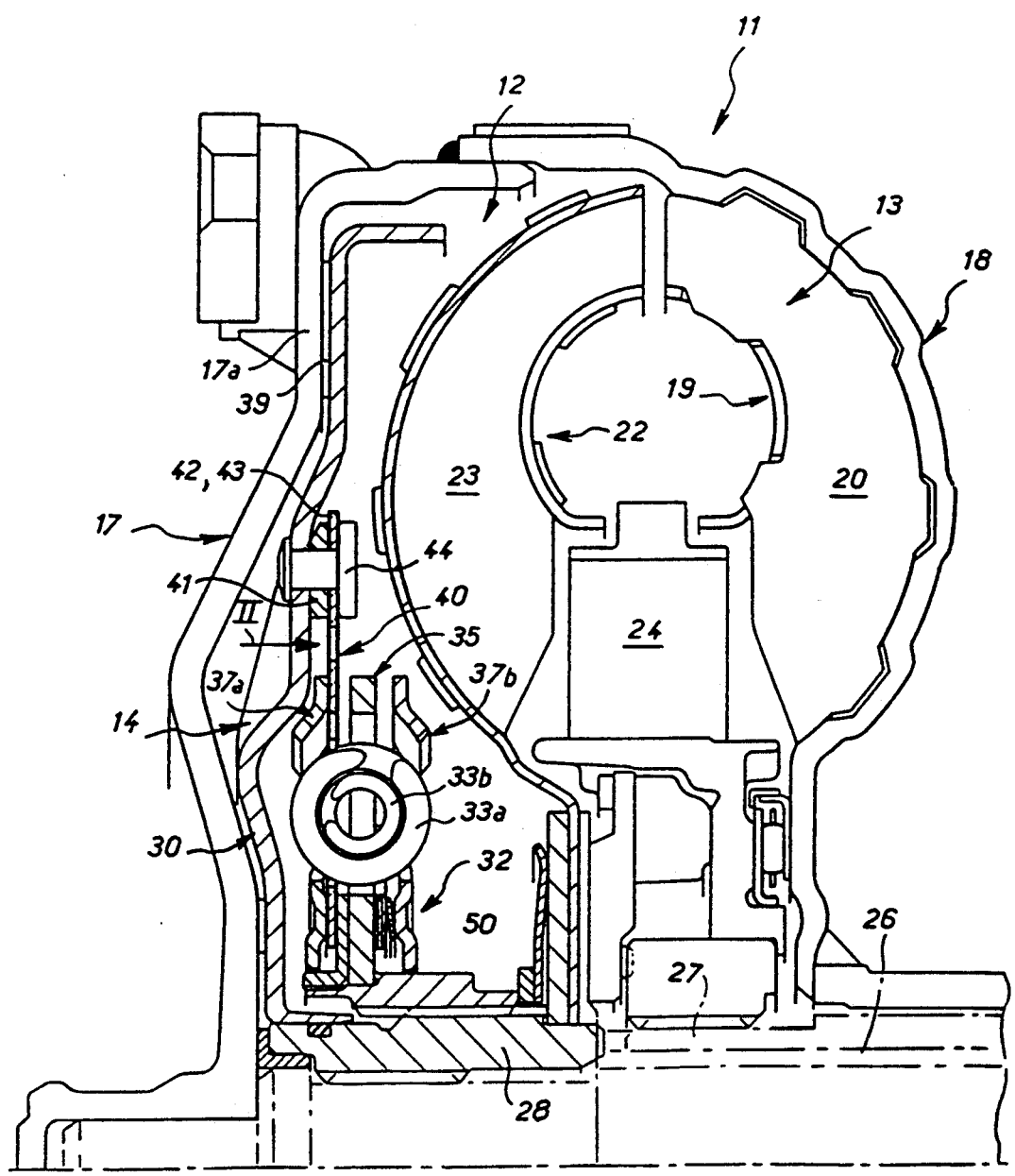
FIG. 1 is a diagrammatic elevation in cross section, showing one half of a fluid coupling apparatus in accordance with the invention.

The fluid coupling apparatus is indicated at 11 in FIG. 1. It comprises a casing 12 which encloses an oil chamber, and, within the casing 12, a torque convertor 13 and a locking clutch 14. The casing 12 is arranged to be coupled in rotation to a driving shaft which in this example is the crankshaft of an internal combustion engine. The casing 12 is for example secured to a diaphragm which is fixed to the said crankshaft in the manner described in the specification of published United Kingdom patent application No. GB 2 045 367A. The casing comprises a first shell 17 having a radially flat annular portion 17a for cooperation with the locking clutch 14, together with an annular second shell 18 which is arranged facing the first shell 17, and which is of a conventional shape so as to define an impulse wheel 19 of the turbine. The blades 20 of this impulse wheel are fixed to the inner face of the second shell 18. The two shells 17 and 18 are in this example secured together by welding so as to be sealed at their outer periphery.

The remainder of the torque convertor comprises a turbine wheel 22 which is provided with blades 23 facing towards the blades 20 of the impulse wheel 19, together with a reaction wheel 24. The turbine wheel 22 is coupled in rotation to a driven shaft 26, through a hub 28 which is coupled to the shaft 26 by means of a splined mounting, while the reaction wheel 24 is connected to a sleeve 27. In this example, the wheel 22 is fixed to the hub 28, and a spring 50 bears indirectly on the wheel 22 so as to bias a torsion damper 32, to be described below, towards the shell 17. Such a torque convertor is generally of a conventional kind.

The clutch 14 comprises a coupling element 30 in the form of a piston which is mounted for axial sliding movement by means of its inner cylindrical portion on the outer surface of the hub 28, which thus serves as a bearing for the piston 30. The clutch 14 also includes the torsion damper 32 which comprises helical springs 33a and 33b. The torsion damper is, again, of a conventional kind. Its main elements are a central damper plate 35, which is relatively thick and which is mounted on the hub 28, for rotation with the latter by means of a splined coupling arrangement and a pair of guide rings 37a and 37b arranged on either side of the central damper plate 35 (considered in the axial direction). The springs 33a and 33b are mounted in housings which are defined by windows formed in the central damper plate 35 and in the guide rings 37a and 37b. The ends of these springs bear against substantially radial edges of the windows in the central damper plate, on the one hand, and the guide rings on the other hand. The transmission element or piston 30 carries a friction liner 39, which is annular and flat and which is arranged to come into contact with the internal face of the flat annular portion 17a of the first shell 17.

The guide ring assembly 37a and 37b is coupled to the transmission element 30 through a thin coupling plate 40, which is axially deformable. The coupling plate 40 is fixed by means of rivets 44 to the coupling element 30, with an annular spacer 41 interposed. It will be noted that the piston 30, which is of serpentine form so as to accommodate the damper 32, is locally deformed in order to provide an abutment surface for the spacer 41 which in this example is a ring. The coupling plate 40 is secured by means of rivets (not shown) to the guide ring, 37a, that is closest to the piston 30. The coupling plate projects radially outwardly by a relatively small amount from the torsion damper 32.

Figure 2:
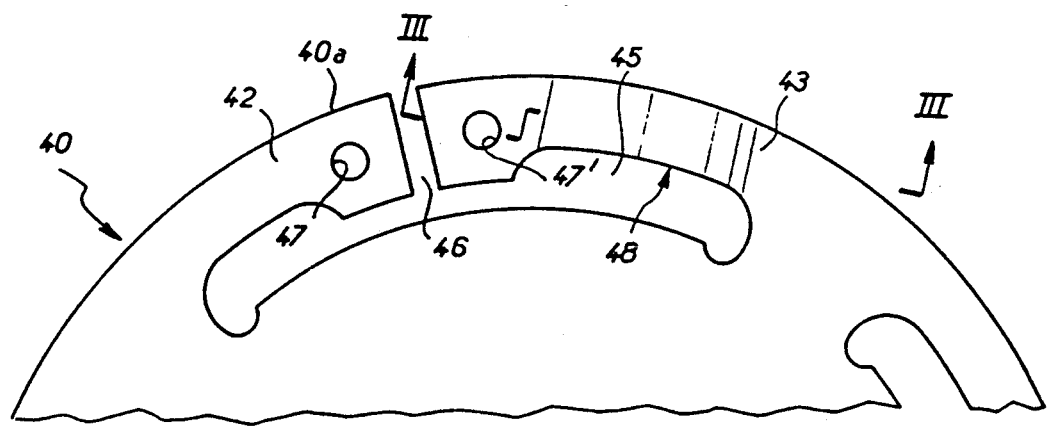
FIG. 2 is a view of part of the coupling plate of the same apparatus.

The coupling plate 40 is shown in FIG. 2, from which it can be seen that it has two sets of resilient tongues 42 and 43, which are axially deformable and which are spaced apart circumferentially at regular intervals. These tongues project radially from the damper 32 and are arranged in pairs in each set of tongues, being elongated in the circumferential direction as extensions of each other. More precisely, the two tongues of each pair are defined at the periphery of the plate 40 by a curved through slot 45, shaped rather like an elongated buttonhole, and by a substantially radial slot 46 which extends from the buttonhole slot 45 to the circular outer edge 40a of the plate. In this example, there are four pairs of tongues 42 and 43, spaced apart at equal intervals circumferentially. The coupling plate 40 lies radially inwardly of the liner 39, in the radially inner part of the turbine 22.

In this example, the buttonhole slot 45 is enlarged at each end circumferentially, and is made narrower adjacent to the radial slot 46. Each of the tongues 42 and 43 thus has a widened terminal end, these terminal ends being adjacent to each other, with each terminal end being formed with a hole 47, 47' respectively, by which the coupling plate 40 is secured to the coupling element 30. A rivet 44 is secured for this purpose between the coupling element 30 and each of the enlarged terminal end portions of the tongues 42, 43. The first set of tongues 42 transmits the torque during "propulsive" operation, that is to say when the engine is effectively driving the vehicle, while the second set of tongues 43 transmits the torque (which is relatively smaller) during "regenerative" operation, that is to say when it is the movement of the vehicle which is tending to drive or retard the engine.

Figure 3:
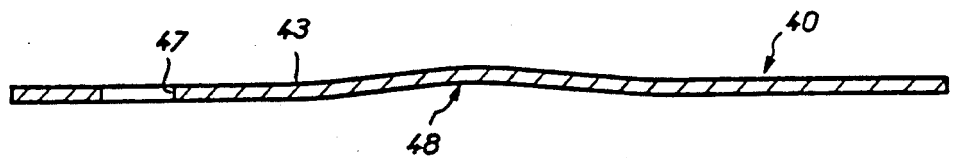
FIG. 3 is a detail view in cross section taken on the line III—III in FIG. 2.

The tongues in at least one of the two sets 42 and 43 each have a small deformation or wave-shaped portion 48, extending axially as seen in FIG. 3 and having its wave profile substantially constant in the radial direction, as can be seen in FIG. 2. Each of the tongues 43 of the set which act to transmit torque in regenerative operation is provided with these wave-shaped deformations 48. In addition, the tongues 43 are longer in the circumferential direction than the tongues 42 of the other set. This is determined by the position of each radial slot 46 along the associated buttonhole slot 45. It will be noted that the holes 47', and thus the rivets associated with them, may be smaller than the holes 47 and their associated rivets, because the forces to be transmitted are smaller. In this example, however, for standardisation reasons, the holes 47 and 47', and their associated rivets, are in fact identical with each other.

With this arrangement, during propulsive operation, the engine drives the gearbox of the vehicle through the flat tongues 42, these being relatively shorter and stiffer, of the first set of tongues. By contrast, when the engine is acting as a brake, i.e. in regenerative operation, the torque is transmitted through the tongues 43; but since the torque is now much smaller, these tongues are in no danger of becoming distorted. However, by virtue of the wave-shaped portions 48, the tongues 43 do enable the coupling plate 40 to perform a better axial movement during operation of the clutch 14: in particular, the torsion damper 32 of the clutch always remains perpendicular to the common axis of the driving shaft and the driven shaft, while the damper plate 35 is able to slide easily along the splines of the hub 28 without any risk of jamming.

Figure 4:
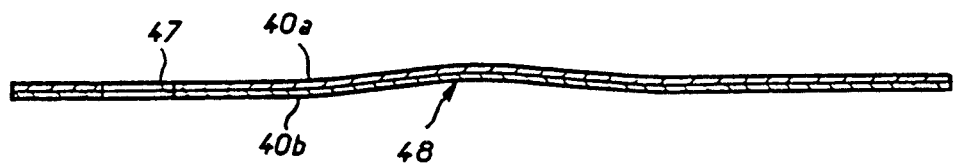
FIG. 4 is a view similar to FIG. 3 but showing a modification.
Figure 5:
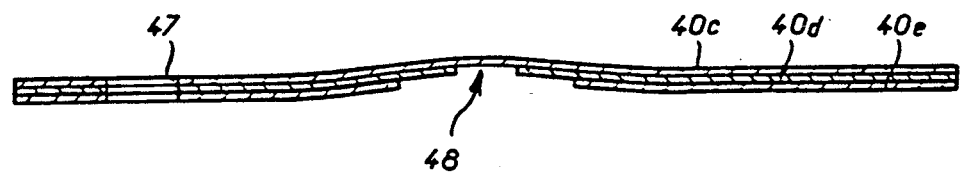
FIG. 5 is another view similar to FIG. 3, but showing a further modification.

Referring now to FIG. 4, in the modification shown in that Figure the coupling plate 40 consists of a plurality of discs which are superimposed axially on each other. In the Figure, there are two of these discs, 40a and 40b, each thinner than the disc 40 shown in FIG. 3. This gives even better axial displacement and good progressive movement. The further modification seen in FIG. 5 comprises three superimposed discs 40c, 40d and 40e. At least one of these discs is interrupted in each of its wave-shaped portions 48. In the particular example of this seen in FIG. 5, two discs 40d and 40e are interrupted in each portion 48, so that the radial slots 46 are of different widths for each disc. This gives a leaf-spring configuration which enables progressive operation to be adjusted by suitable choice of the widths of these radial slots.

It will be appreciated that the arrangement in accordance with the invention is smaller in the radial direction at the level of the annular liner 39, and also that the fastenings of the blades 23 are reduced.

What is claimed is:

1. Fluid coupling apparatus including a torque convertor, a locking clutch which includes a first coupling element, means mounting the first coupling element for axial movement as a piston, and a second coupling element coupling the said first coupling element to the torque convertor, wherein the second coupling element comprises a coupling plate having two sets of tongues which are resiliently deformable in the axial direction, namely a first set in which the tongues extend circumferentially in a first direction and a second set in which the tongues extend circumferentially in a second direction opposite to the first direction, the apparatus further including a torsion damper with which the coupling plate is associated, the tongues of at least one said set each having a slight, wave-shaped, axial deformation.

2. Apparatus according to claim 1, wherein the tongues of only one said set have the said wave-shaped deformations, the set concerned being adapted to transmit torque when the apparatus is coupled to an engine of a vehicle with the vehicle operating in a regenerative mode.

3. Apparatus according to claim 1 coupled to an engine of a vehicle, wherein the tongues of one said set are arranged to transmit torque when the vehicle is operating in a regenerative mode, the tongues of that set being longer circumferentially than those of the other set.

4. Apparatus according to claim 1, wherein the said tongues are arranged in pairs with the tongues of each pair comprising a tongue of the first set and a tongue of the second set, aligned with each other and forming an extension of each other, the tongues of each pair being bounded at the periphery of the coupling plate by a curved buttonhole-shaped slot and by a substantially radial slot extending between the buttonhole-shaped slot and the outer edge of the coupling plate.

5. Apparatus according to claim 1, wherein the coupling plate comprises a plurality of discs superimposed axially on each other.

6. Apparatus according to claim 5, wherein at least one disc of the coupling plate is interrupted in the region of each said wave-shaped deformation.

7. Apparatus according to claim 1, wherein the said tongues project radially with respect to the torsion damper, the apparatus further comprising means securing the tongues to the torsion damper.

* * * * *